US012631448B2

(12) United States Patent (10) Patent No.: US 12,631,448 B2
Dati et al. (45) Date of Patent: May 19, 2026

(54) OPERATOR DEVICE AND METHOD FOR OPERATING A CAPACITIVE SENSOR

(71) Applicant: Robert Bosch GmbH, Stuttgart (DE)

(72) Inventors: Angelo Dati, Mailand (IT); Burkhard Kuhlmann, Reutlingen (DE); Joan Josep Giner De Haro, Stuttgart (DE); Mirko Hattass, Stuttgart (DE); Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 344 days.

(21) Appl. No.: 18/484,759

(22) Filed: Oct. 11, 2023

(65) Prior Publication Data

US 2024/0159533 A1 May 16, 2024

(30) Foreign Application Priority Data

Nov. 16, 2022 (DE) ..................... 10 2022 212 208.9

(51) Int. Cl.
    *G01C 19/56* (2012.01)
    *G01C 19/5726* (2012.01)
    (Continued)

(52) U.S. Cl.
    CPC ......... *G01C 19/56* (2013.01); *G01C 19/5726* (2013.01); *G01C 19/5733* (2013.01);
    (Continued)

(58) Field of Classification Search
    CPC   G01C 19/56; G01C 19/5726; G01C 19/5733; G01C 19/5747; G01C 25/005; G01D 5/241
    See application file for complete search history.

(56) References Cited

U.S. PATENT DOCUMENTS

2012/0024059 A1*   2/2012   Classen .............. G01C 19/5747
                                                       73/504.12
2013/0199263 A1*   8/2013   Egretzberger ..... G01C 19/5726
                                                       73/1.38
(Continued)

FOREIGN PATENT DOCUMENTS

DE      102008040854 A1     2/2010
DE      102013203379 A1     8/2013
(Continued)

*Primary Examiner* — Ryan D Walsh
(74) *Attorney, Agent, or Firm* — NORTON ROSE FULBRIGHT US LLP

(57) ABSTRACT
An operator device for a capacitive sensor. The device includes an electronic device, by means of which an actual gap distance between the seismic mass and the at least one electrode and/or an actual variable for a sensitivity of the capacitive sensor can be determined, taking into account at least a first constant voltage, a first natural frequency of a first harmonic vibration of a seismic mass along a spatial direction, centrally intersecting the seismic mass and the at least one electrode, when the first constant voltage is applied between the seismic mass and the at least one electrode, a second constant voltage and a second natural frequency of a second harmonic vibration of the seismic mass along the spatial direction, centrally intersecting the seismic mass and the at least one electrode, when the second constant voltage is applied between the seismic mass and the at least one electrode.

12 Claims, 4 Drawing Sheets

(51) Int. Cl.
     G01C 19/5733          (2012.01)
     G01C 19/5747          (2012.01)
     G01C 25/00            (2006.01)
     G01D 5/241            (2006.01)

(52) U.S. Cl.
     CPC ....... G01C 19/5747 (2013.01); G01C 25/005
                 (2013.01); G01D 5/241 (2013.01)

(56)                    References Cited

U.S. PATENT DOCUMENTS

| | | | |
|---|---|---|---|
| 2013/0221453 A1* | 8/2013 | Dehe | H04R 19/005 |
| | | | 257/E29.324 |
| 2018/0128851 A1* | 5/2018 | Malvern | G01P 15/131 |
| 2024/0159535 A1* | 5/2024 | Dati | G01C 19/5726 |

FOREIGN PATENT DOCUMENTS

| | | |
|---|---|---|
| DE | 102014211646 A1 | 12/2015 |
| DE | 102022200335 A1 | 7/2023 |

* cited by examiner

OPERATOR DEVICE AND METHOD FOR OPERATING A CAPACITIVE SENSOR

CROSS REFERENCE

The present application claims the benefit under 35 U.S.C. § 119 of German Patent Application No. DE 10 2022 212 208.9 filed on Nov. 16, 2022, which is expressly incorporated herein by reference in its entirety.

FIELD

The present invention relates to an operator device for a capacitive sensor and to a capacitive sensor. Furthermore, the present invention relates to a method for operating a capacitive sensor.

BACKGROUND INFORMATION

Capacitive sensors, such as the rotation rate sensor described in German Patent Application No. DE 10 2014 211 646 A1, are from the related art. Such a capacitive sensor has at least one seismic mass and at least one detector electrode non-adjustably fastened to and/or in the capacitive sensor, so that a deflection, induced by an external force, of the respective seismic mass, which is stationary or put into a harmonic drive vibration, in relation to the respectively assigned detector electrode can be detected. Optionally, such a capacitive sensor may also have at least one drive electrode non-adjustably fastened to and/or in the capacitive sensor, whereby its at least one seismic mass can be put into the harmonic drive vibration by means of a voltage applied between the respective seismic mass and the at least one assigned drive electrode.

SUMMARY

The present invention provides an operator device for a capacitive sensor, a capacitive sensor, and a method for operating a capacitive sensor.

The present invention provides advantageous possibilities for reliably determining an actual gap distance between a seismic mass of a capacitive sensor and at least one electrode of the same capacitive sensor and/or an actual variable for a sensitivity of the capacitive sensor. As becomes clear on the basis of the following description, the actual gap distance between the seismic mass and the at least one adjacent electrode and/or the actual variable for the sensitivity can be reliably determined by means of the present invention without any hardware expansion of the respective capacitive sensor. In particular, the use of the present invention eliminates the conventional need to equip the respective capacitive sensor with at least one additional electrode, which is used exclusively for measuring the actual gap distance and/or the actual variable for the sensitivity but cannot be used further for operating the capacitive sensor. The present invention thus also enables miniaturization of the capacitive sensor by dispensing with such an electrode type. The present invention thus also contributes to simplifying a design of the capacitive sensor that uses it. Furthermore, the present invention can be performed, as becomes clear on the basis of the following description, by means of a comparatively cost-efficient electronic system requiring relatively little installation space.

The actual gap distance, reliably determinable by means of the present invention, between the seismic mass and the at least one adjacent electrode and the alternatively or additionally determinable actual variable for the sensitivity are suitable not only for ascertaining effects of a stress load on the respective capacitive sensor but also for readjusting/recalibrating the capacitive sensor to minimize or eliminate the effects of the stress loads. Such "correctable" stress loads are, for example, mechanical actions on the capacitive sensor by a soldering process, mechanical actions on the capacitive sensor by overmolding it with a molding compound, exposure of the capacitive sensor to moisture, and/or an action of an external force on the capacitive sensor. Traditionally, such stress loads frequently result in a change in the actual gap distance between the seismic mass of the respective capacitive sensor and the at least one adjacent electrode and/or in the sensitivity of the respective capacitive sensor. However, as becomes clear on the basis of the following description, despite its exposure to stress loads, which change the actual gap distance and/or the sensitivity, the respective capacitive sensor can subsequently be readjusted/recalibrated by means of the present invention such that reliable operation of the respective capacitive sensor still remains ensured.

In an advantageous embodiment of the operator device of the present invention, the electronic device is designed and/or programmed in such a way that the actual gap distance d between the seismic mass and the at least one electrode can be determined by means of the electronic device, taking into account the first constant voltage $U_1$, the first natural frequency $f_1$, the second constant voltage $U_2$ and the second natural frequency $f_2$, according to the equation:

$$\frac{1}{d^3} = \frac{f_2 - f_1}{U_2^2 - U_1^2} * K_1,$$

wherein the constant $K_1$ is stored in a storage device of the operator device. By means of the design of the electronic device described herein, the "true" actual gap distance d, or its change due to mechanical stress actions, can thus be reliably determined.

Alternatively or additionally, according to an example embodiment of the present invention, the electronic device may also be designed and/or programmed in such a way that a response sensitivity $S_e$ of the at least one electrode of the capacitive sensor as the actual variable $S_e$ for the sensitivity S of the capacitive sensor can be determined by means of the electronic device, taking into account the first constant voltage $U_1$, the first natural frequency $f_1$, the second constant voltage $U_2$ and the second natural frequency $f_2$, according to the equation:

$$S_e = \left(\frac{f_2 - f_1}{U_2^2 - U_1^2}\right)^{\frac{2}{3}} * K_2,$$

wherein the constant $K_2$ is stored in the storage device of the operator device. The response sensitivity $S_e$ (electrical sensitivity) has a significant influence on the (total) sensitivity of the capacitive sensor. Its relatively accurate determinability by means of the design of the electronic device described herein is therefore greatly advantageous.

As an advantageous development of the present invention, the electronic device can be designed and/or programmed in such a way that the electronic device can at least once store a determined actual gap distance as the reference gap distance and/or a determined actual variable for the sensitivity of the capacitive sensor as the reference variable in the storage device of the operator device and that, at at least one later point in time, an actual gap distance redetermined at the respective point in time is comparable to the reference gap distance and/or an actual variable for the sensitivity of the capacitive sensor redetermined at the respective point in time is comparable to the reference variable. Both during further processing process of the respective capacitive sensor and during its entire service life, it is thus possible to examine again and again by means of the comparison of the redetermined actual gap distance to the reference gap distance and/or by means of the comparison of the redetermined actual variable to the reference variable, whether the "true" gap distance between the seismic mass and the at least one adjacent electrode and/or the sensitivity S of the capacitive sensor have changed.

Preferably, in this case, according to an example embodiment of the present invention, the electronic device is additionally designed and/or programmed in such a way that, taking into account the actual gap distance compared to the reference gap distance and/or the actual variable compared to the reference variable, and additionally taking into account a target variable, stored in the storage device of the operator device, for a target amplification factor of a signal path of the capacitive sensor, at least one amplification device in the signal path can be adjusted or controlled by means of the electronic device in such a way that an actual amplification factor of the signal path corresponds to the target variable. By means of the knowledge of the "true" gap distance and/or the changed sensitivity of the capacitive sensor, the signal path of the latter can be readjusted in such a way that a resulting functionality of the capacitive sensor is optimized.

The advantages described above are also ensured for a capacitive sensor comprising such an operator device according to the present invention.

For example, the capacitive sensor may be a rotation rate sensor. The present invention can thus be used for a frequently used sensor type. It is however pointed out that usability of the present invention is not limited to rotation rate sensors.

Performing a corresponding method for operating a capacitive sensor also brings about the advantages described above. It is pointed out that the method can be developed according to the above-explained embodiments of the operator device.

Preferably, according to an example embodiment of the present invention, a frequency variation gradient of voltage-dependent natural frequencies of the seismic mass is determined taking into account at least the first constant voltage, the determined first natural frequency, the second constant voltage and the determined second natural frequency, wherein the actual gap distance between the seismic mass and the at least one electrode and/or the actual variable for the sensitivity of the capacitive sensor are determined taking into account the determined frequency variation gradient. The procedure described herein enables relatively reliable and error-free determination of the actual gap distance and/or the actual variable for the sensitivity of the capacitive sensor.

In one advantageous embodiment of the method of the present invention, in order to determine the first natural frequency and at least also the second natural frequency, a variable alternating voltage with a varying test frequency is in each case applied between the seismic mass and at least one quadrature electrode of the capacitive sensor while the seismic mass is put or being put into a resonant harmonic drive vibration with a natural drive frequency, and it is examined at which test frequency the seismic mass is put into a resonant vibration by means of the variable alternating voltage. This enables reliable determination of the first natural frequency and at least also the second natural frequency.

Alternatively, according to an example embodiment of the present invention, in order to determine the first natural frequency and at least also the second natural frequency, a short constant voltage signal may in each case be applied between the seismic mass and at least one quadrature electrode of the capacitive sensor while the seismic mass is put or being put into a resonant harmonic drive vibration with a natural drive frequency. In this way, too, the first natural frequency and at least also the second natural frequency can be reliably determined.

In a further, advantageous embodiment of the method of the present invention, a determined actual gap distance as the reference gap distance and/or a determined actual variable for the sensitivity of the capacitive sensor as the reference variable are stored at least once in a storage device and, at at least one later point in time, an actual gap distance redetermined at the respective point in time is compared to the reference gap distance and/or an actual variable for the sensitivity of the capacitive sensor redetermined at the respective point in time is compared to the reference variable. In this way, it is reliably discernible whether mechanical loads during further processing of the capacitive sensor or during operation thereof have changed the "true" gap distance and/or the sensitivity S thereof.

Preferably, where applicable, taking into account the actual gap distance compared to the reference gap distance and/or the actual variable compared to the reference variable, and additionally taking into account a target variable, stored in the storage device, for a target amplification factor of a signal path of the capacitive sensor, at least one amplification device in the signal path is adjusted or controlled until an actual amplification factor of the signal path corresponds to the target variable. In this way, a readjustment/recalibration of the capacitive sensor/signal path thereof is also possible, which minimizes/eliminates effects of mechanical stress loads.

BRIEF DESCRIPTION OF THE DRAWINGS

Further features and advantages of the present invention are explained below with reference to the figures.

DETAILED DESCRIPTION OF EXAMPLE EMBODIMENTS

Figures 1A, 1B:
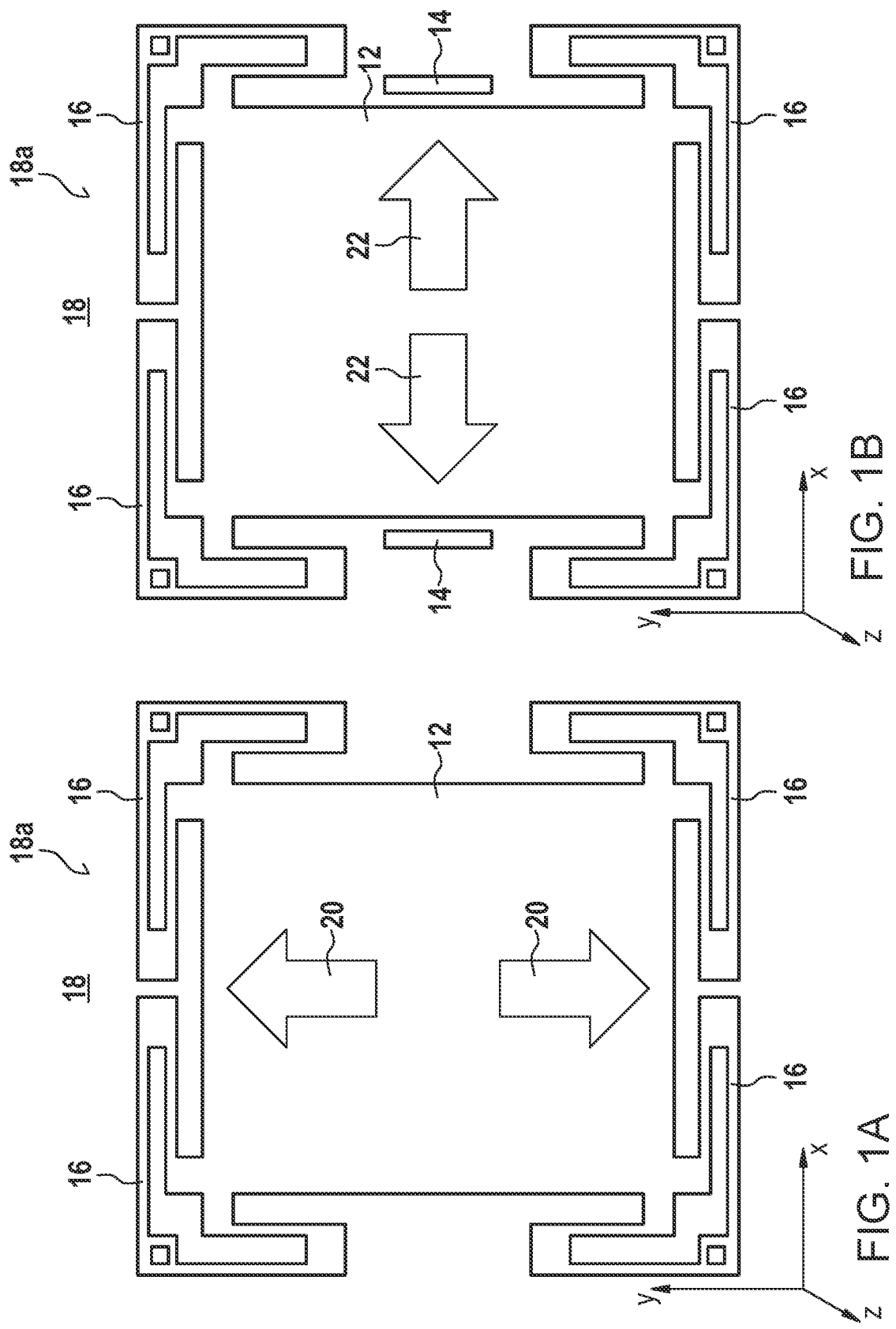
FIGS. 1A to 1C show schematic representations of a capacitive sensor for explaining a mode of operation of an example embodiment of the operator device cooperating therewith, according to the present invention.
Figure 1C:
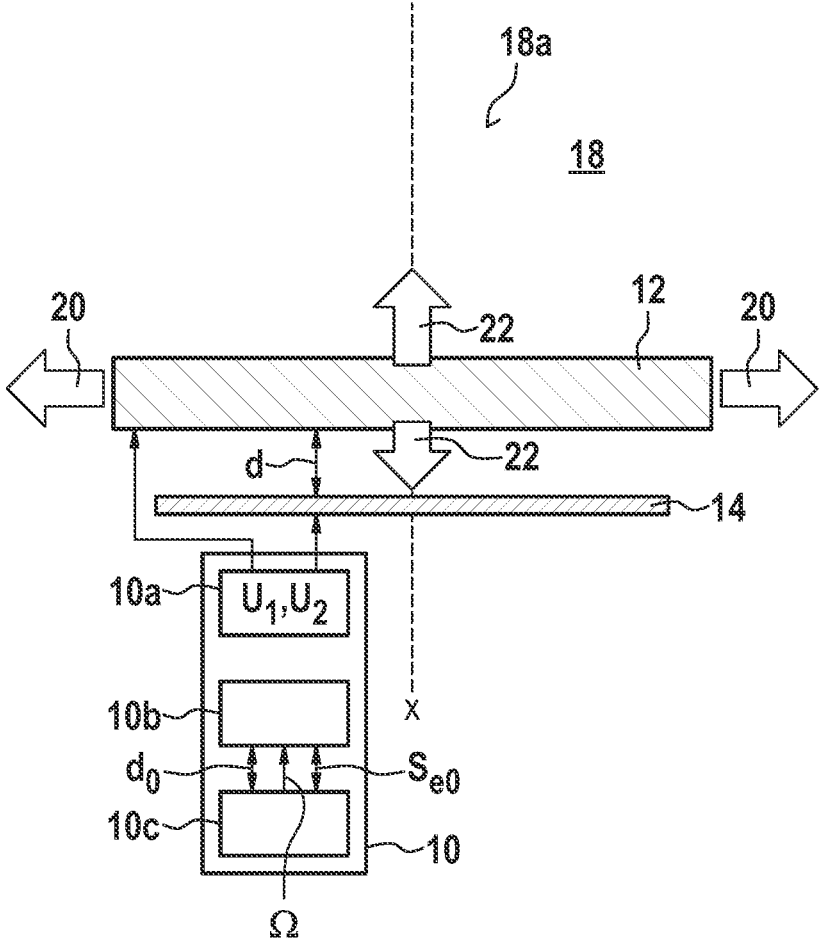

FIGS. 1A to 1C show schematic diagrams of a capacitive sensor for explaining a mode of operation of an embodiment of the operator device cooperating therewith.

The capacitive sensor schematically illustrated in FIGS. 1A to 1C is, merely by way of example, a rotation rate sensor. It is expressly pointed out that the below-described operator device 10 of the capacitive sensor can cooperate with (nearly) any sensor type of capacitive sensors that comprises at least one seismic mass 12 and at least one electrode 14, wherein the at least one electrode 14 can be contacted in such a way and is arranged relative to the seismic mass 12 such that a voltage unequal to zero can be applied between the seismic mass 12 and the at least one electrode 14. Usability of the operator device 10 is thus not limited to rotation rate sensors.

A seismic mass 12 is understood to mean an adjustable mass 12 arranged on and/or in the capacitive sensor. Preferably, the seismic mass 12 is connected via at least one spring 16 to a substrate surface 18*a* of a substrate 18 in such a way that the seismic mass 12 can be adjusted in relation to the substrate 18 while deforming the at least one spring 16. The alignment of the substrate surface 18*a* of the substrate 18 in FIGS. 1A to 1C perpendicular to the z-axis is to be interpreted by way of example only. In the embodiment of FIGS. 1A to 1C, via a drive mechanism (not shown) of the capacitive sensor, the seismic mass 12 can additionally be put into a harmonic drive vibration illustrated by means of the arrows 20, in particular into a resonant harmonic drive vibration (see FIG. 1A). For example, the capacitive sensor may comprise at least one drive electrode non-adjustably fastened to and/or in the capacitive sensor, wherein a varying voltage signal can be applied between the seismic mass 12 and the at least one assigned drive electrode in such a way that the seismic mass 12 can be put/is put into the harmonic drive vibration. Preferably, the harmonic drive vibration of the seismic mass 12 is parallel to the substrate surface 18*a* of the substrate 18. Merely by way of example, the harmonic drive vibration of the seismic mass 12 in FIG. 1A runs along the y-axis.

As illustrated in FIG. 1B, rotation of the capacitive sensor with a rotation component unequal to zero and perpendicular to the substrate surface 18*a* of the substrate 18 brings about a deflection, indicated by means of the arrows 22, of the seismic mass put into the harmonic drive vibration. In this case, the Coriolis force can in particular induce a deflection vibration movement of the seismic mass 12 parallel to the substrate surface 18*a* of the substrate 18 and perpendicular to the harmonic drive vibration of the seismic mass 12. In the example of FIG. 1B, the deflection vibration movement of the seismic mass 12 is therefore aligned along the x-axis.

It can be seen with reference to FIGS. 1B and 1C that the at least one electrode 14 is non-adjustably fastened to and/or in the capacitive sensor in such a way that the deflection vibration movement of the seismic mass 12 caused by means of the Coriolis force results in a variation of a respective distance of the seismic mass 12 from the at least one electrode 14 in the capacitive sensor. For example, the at least one electrode 14 may be at least a so-called detector electrode, which is used during a detection and/or measurement operation of the capacitive sensor to demonstrate and/or detect the deflection vibration movement of the seismic mass 12.

The capacitive sensor illustrated in FIGS. 1A to 1C has a (total) sensitivity S, which is significantly influenced in particular by a so-called response sensitivity $S_e$ of the at least one electrode 14 of the capacitive sensor. The response sensitivity $S_e$ is frequently also referred to as electrical sensitivity. The response sensitivity $S_e$ is defined according to equation (Eq. 1) as follows:

$$S_e \approx \frac{\epsilon_0 * A}{d^2} = \frac{C_0}{d} \qquad \text{(Eq. 1)}$$

The response sensitivity $S_e$ is thus dependent on an actual gap distance d of the seismic mass 12 from the at least one electrode 14, which is present if the seismic mass 12 does not perform any deflection vibration movement (e.g., with a Coriolis force equal to zero). The further variables given in equation (Eq. 1) are a respective surface area A of each electrode surface of the at least one electrode 14 of the capacitive sensor aligned with the seismic mass 12, and the electric field constant in vacuo $\epsilon_0$.

However, during further processing of the capacitive sensor, e.g., when fastening the capacitive sensor to contacting electronics and/or when packaging the capacitive sensor, and during operation of the capacitive sensor, changes in the actual gap distance d between the seismic mass 12 and the at least one electrode 14 can occur. As becomes clear with reference to equation (Eq. 1), changes in the actual gap distance d also influence the response sensitivity $S_e$ of the at least one electrode 14 of the capacitive sensor, and thus also the (total) sensitivity S thereof. By means of the below-described design of the operator device 10, an advantageous response to such changes in the actual gap distance d is however enabled.

The operator device 10 can optionally be a sub-unit of the capacitive sensor or be arranged externally to the capacitive sensor. The operator device 10 comprises a voltage application device 10*a*, which is designed and/or programmed in such a way that, optionally, at least a first constant voltage $U_1$ unequal to zero or a second constant voltage $U_2$ unequal to zero (and unequal to the first constant voltage $U_1$) can be applied/are applied between the seismic mass 12 and the at least one electrode 14 by means of the voltage application device 10*a*. The seismic mass 12 and the at least one electrode 14 form a harmonic oscillator in which the seismic mass 12 can be put into harmonic vibrations along the x-axis which centrally intersects the seismic mass 12 and the at least one electrode 14. When the first constant voltage $U_1$ is applied, a first harmonic vibration of the seismic mass 12 along the x-axis has a first natural frequency $f_1$. Accordingly, when the second constant voltage $U_2$ is applied, a second harmonic vibration of the seismic mass 12 has a second natural frequency $f_2$, which deviates from the first natural frequency $f_1$.

The operator device 10 also comprises an electronic device 10*b*, which is designed and/or programmed in such a way that the actual gap distance d between the seismic mass 12 and the at least one electrode 14 and/or an actual variable $S_e$ for the sensitivity S of the capacitive sensor can be determined/are determined by means of the electronic device 10*b*, taking into account at least the first constant voltage $U_1$, the first natural frequency $f_1$, the second constant voltage $U_2$ and the second natural frequency $f_2$. For example, the first natural frequency $f_1$ and/or the second natural frequency $f_2$ can be self-determined by the electronic device 10*b*. Advantageous possibilities for determining the first natural frequency $f_1$ and the second natural frequency $f_2$ are discussed below. Alternatively, the capacitive sensor may also be equipped with a sensor system (not shown), which is designed and/or programmed to determine the first natural frequency $f_1$ and/or the second natural frequency $f_2$ and to provide them/it to the electronic device 10*b*.

With the actual gap distance d and/or the actual variable $S_e$ for the sensitivity S of the capacitive sensor, the operator device 10 described herein can thus determine data, the knowledge of which is advantageous for the further operation of the capacitive sensor. Since the actual gap distance d and the actual variable S, for the sensitivity S are influenced by stress loads on the capacitive sensor, the knowledge of these data can in particular also be used to minimize or eliminate the effects of the stress loads on the capacitive sensor. Such stress loads, which can be minimized or eliminated by means of the operator device 10, occur frequently, for example in a soldering process, when over-molding the capacitive sensor with a molding compound, when exposing the capacitive sensor to moisture, or when an external force acts on the capacitive sensor. However, by means of the design of the operator device 10 explained herein, the conventional disadvantages of such stress loads do not/hardly have to be accepted during further operation of the capacitive sensor.

The values $U_1$, $U_2$, $f_1$ and $f_2$ evaluated by the electronic device 10b in order to determine the actual gap distance d and/or the actual variable S, for the sensitivity S of the capacitive sensor are advantageously suitable for their reliable determination. In general, a natural frequency f of a mass m of a harmonic oscillator is defined according to equation (Eq. 2) as follows:

$$f = \frac{1}{2\pi} * \sqrt{\frac{k_m + k_e}{m}}, \quad \text{(Eq. 2)}$$

wherein $k_m$ is a mechanical spring stiffness and $k_e$ is a stiffness due to electrostatic forces. According to Hooke's Law, equation (Eq. 3) applies to the coefficient $k_e$ as follows:

$$k_e = \frac{\partial F_e}{\partial x} \quad \text{(Eq. 3)}$$

The electrostatic force $F_e$ is defined according to equation (Eq. 4) as follows:

$$F_e = \frac{1}{2} \frac{\partial C}{\partial x} U^2 \quad \text{(Eq. 4)}$$

wherein C is a capacitance of the respective plate capacitor and U is a voltage applied to the respective plate capacitor. Equation (Eq. 3) can thus be converted into equation (Eq. 5) as follows:

$$k_e = -\frac{C_0}{d^2} U^2 \quad \text{(Eq. 5)}$$

The constant $C_0$ has already been introduced in equation (Eq. 1). Accordingly, equation (Eq. 2) can be converted into equation (Eq. 6) as follows:

$$f \approx f_0 \left(1 - \frac{1}{2} * \frac{C_0}{k_m * d^2} U^2 \right), \quad \text{(Eq. 6)}$$

wherein $f_0$ is a natural base frequency. Using equation (Eq. 6), equation (Eq. 7) for a frequency variation gradient (frequency tuning capability) $\Delta$ can be derived from voltage-dependent natural frequencies of the seismic mass 12 as follows:

$$\Delta = \frac{\partial f}{\partial U^2} = f_0 * \frac{1}{2} * \frac{C_0}{k_m * d^2} \sim \frac{1}{d^3} \quad \text{(Eq. 7)}$$

According to equation (Eq. 7), the frequency variation gradient $\Delta$ of the voltage-dependent natural frequencies of the seismic mass 12 is thus proportional to the reciprocal value of the third power of the actual gap distance d between the seismic mass 12 and the at least one adjacent electrode 14. A change in the actual gap distance d can therefore be ascertained by means of the values $U_1$, $U_2$, $f_1$ and $f_2$ with a comparatively high reliability and a relatively low error deviation. As also becomes clear with reference to equation (Eq. 1), the actual variable $S_e$ for the sensitivity S of the capacitive sensor can also be reliably determined by means of a corresponding evaluation of the values $U_1$, $U_2$, $f_1$ and $f_2$.

For example, the electronic device 10b can be designed and/or programmed in such a way that the actual gap distance d between the seismic mass 12 and the at least one electrode 14 can be determined by means of the electronic device 10b, taking into account the first constant voltage $U_1$, the first natural frequency $f_1$, the second constant voltage $U_2$ and the second natural frequency $f_2$, according to equation (Eq. 8) as follows:

$$\frac{1}{d^3} = \frac{f_2 - f_1}{U_2^2 - U_1^2} * K_1, \quad \text{(Eq. 8)}$$

wherein the constant $K_1$ is stored in a storage device 10c of the operator device 10. The individual values of the constant $K_1$ can be derived using equation (Eq. 7).

Alternatively or additionally, the electronic device 10b may also be designed and/or programmed to determine the response sensitivity $S_e$ of the at least one electrode of the capacitive sensor (as the actual variable $S_e$ for the sensitivity S of the capacitive sensor), taking into account the first constant voltage $U_1$, the first natural frequency $f_1$, the second constant voltage $U_2$ and the second natural frequency $f_2$, according to equation (Eq. 9) as follows:

$$S_e = \left(\frac{f_2 - f_1}{U_2^2 - U_1^2}\right)^{\frac{2}{3}} * K_2 \quad \text{(Eq. 9)}$$

The constant $K_2$, the individual values of which can be derived from equations (Eq. 1) and (Eq. 7), can also be stored in the storage device 10c of the operator device 10.

Provided that the operator device 10 comprises the storage device 10c, the electronic device 10b can also be designed/programmed as an advantageous development to at least once store a determined actual gap distance d as the reference gap distance $d_0$ and/or a determined actual variable $S_e$ for the sensitivity S of the capacitive sensor as the reference variable $S_{e0}$ in the storage device 10c. At at least one later point in time, an actual gap distance d redetermined at the respective point in time can be compared to the reference gap distance $d_0$ and/or an actual variable $S_e$ for the sensitivity S of the capacitive sensor redetermined at the respective point in time can be compared to the reference variable $S_{e0}$. In this way, it can be recognized with high probability when a stress load on the capacitive sensor during further processing or during operation thereof results in a change in the actual gap distance d and/or in the sensitivity S of the capacitive sensor.

A further advantage of equipping the operator device 10 with the storage device 10c is that the operator device 10 in this case can additionally help to minimize or prevent effects of the respective stress load on the further operation of the micromechanical component. Preferably, in this case, the electronic device $10b$ is additionally designed and/or programmed in such a way that, taking into account the actual gap distance d compared to the reference gap distance $d_0$ and/or the actual variable $S_e$ compared to the reference variable $S_{e0}$, and additionally taking into account a target variable $\Omega$, stored in the storage device $10c$ of the operator device $10$, for a target amplification factor of a signal path (not shown) of the capacitive sensor, at least one amplification device in the signal path can be adjusted or controlled by means of the electronic device $10b$ in such a way that an actual amplification factor of the signal path corresponds to the target variable $\Omega$. The signal path may also be understood to mean an amplification path of the capacitive sensor and/or a data path of the capacitive sensor. For example, multiplying by a digital amplification factor causes an actual sensitivity of the capacitive sensor to correspond to a reference or target sensitivity predetermined as the target variable $\Omega$.

The advantageous design of the operator device $10$ described in the previous paragraph for readjusting the later-applied amplification of the capacitive sensor thus enables a readjustment/recalibration of the capacitive sensor such that effects of mechanical stress loads on the capacitive sensor are "corrected." Even in the event of deformation of the capacitive sensor, for example of its MEMS structure and/or its packaging, the operator device $10$ can still optimize, by means of the advantageous readjustment/recalibration of the capacitive sensor, the mode of operation thereof with regard to a desired target mode of operation.

Figure 2A:
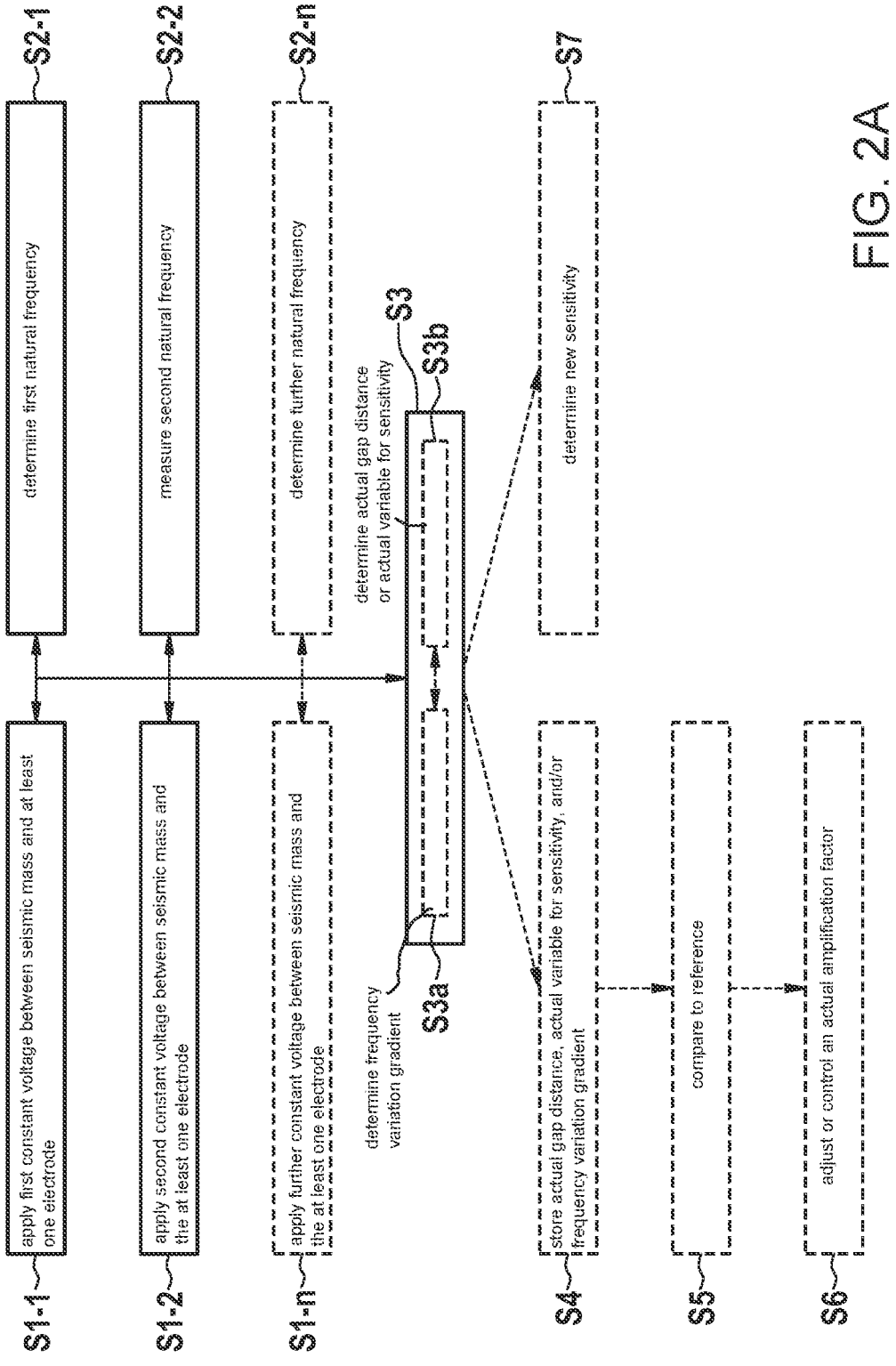
FIGS. 2A to 2C show a flow chart, a schematic representation of a capacitive sensor, and a coordinate system for explaining an example embodiment of the method for operating the capacitive sensor, according to the present invention.
Figure 2B:
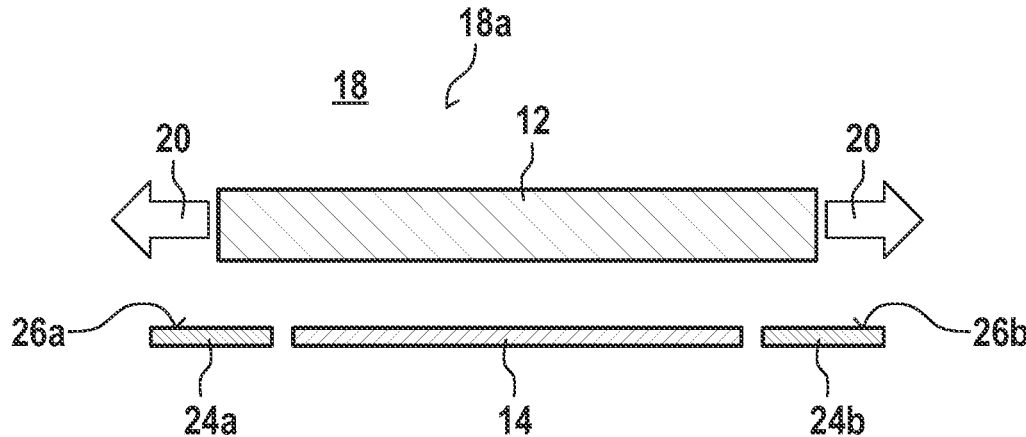
Figure 2C:
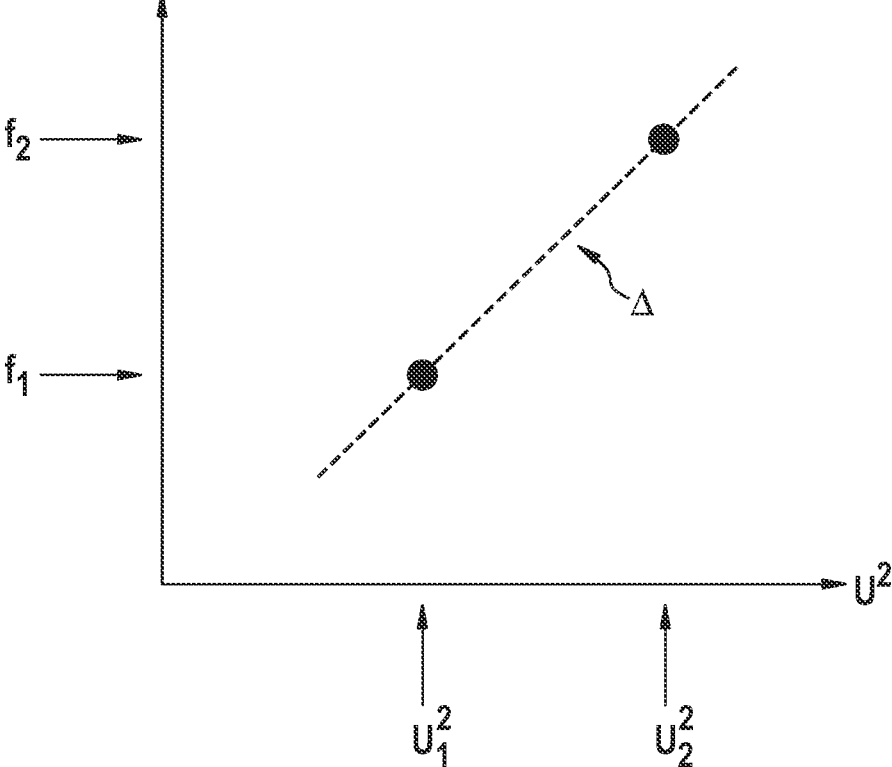

FIGS. 2A to 2C show a flow chart, a schematic representation of a capacitive sensor, and a coordinate system for explaining an embodiment of the method for operating the capacitive sensor.

In a method step S1-1 of the method described herein, a first constant voltage $U_1$ unequal to zero is applied between a seismic mass $12$ of the capacitive sensor and at least one electrode $14$ of the (same) capacitive sensor. In a method step S2-1 performed (mostly simultaneously), a first natural frequency $f_1$ of a first harmonic vibration of the seismic mass $12$ along a spatial direction centrally intersecting the seismic mass $12$ and the at least one electrode $14$ is determined with a first constant voltage $U_1$ applied between the seismic mass $12$ and the at least one electrode $14$.

In a subsequently performed method step S1-2, a second constant voltage $U_2$ unequal to zero (and unequal to the first constant voltage $U_1$) is also applied between the seismic mass $12$ and the at least one electrode $14$. In addition, in a method step S2-2 performed (generally simultaneously) with method step S1-2, a second natural frequency $f_2$ of a second harmonic vibration of the seismic mass $12$ along the spatial direction centrally intersecting the seismic mass $12$ and the at least one electrode $14$ is measured when the second constant voltage $U_2$ is applied between the seismic mass $12$ and the at least one electrode $14$.

Optionally, in at least one method step S1-$n$ performed later, at least one further constant voltage $U_n$ unequal to zero (and unequal to the constant voltages $U_1$ and $U_2$) can also be applied between the seismic mass $12$ and the at least one electrode $14$. Accordingly, in at least one further (optional) method step S2-$n$, which is performed substantially simultaneously with the application of the respective further constant voltage $U_n$, the respective natural frequency $f_n$ of an nth harmonic vibration of the seismic mass $12$ along the spatial direction centrally intersecting the seismic mass $12$ and the at least one electrode $14$ can be determined with a further constant voltage $U_n$ applied between the seismic mass $12$ and the at least one electrode $14$.

FIG. 2B illustrates advantageous possibilities for performing method steps S2-1, S2-2 and possibly S2-$n$. These possibilities use the fact that the seismic mass $12$ in a capacitive sensor frequently can be put/is put by means of a drive mechanism of the capacitive sensor into a resonant harmonic drive vibration, which is illustrated by means of the arrows $20$ and has a frequency referred to below as natural drive frequency $f_{20}$. Specifically, in this case, when performing method steps S2-1, S2-2 and possibly S2-$n$, a respective frequency difference $\Delta f_1$, $\Delta f_2$ and possibly $\Delta f_n$ between the natural drive frequency $f_{20}$ and the respective natural frequency $f_1$, $f_2$ or $f_n$ to be determined can be determined.

For this purpose, the schematically illustrated capacitive sensor also comprises at least one so-called quadrature electrode $24a$ and $24b$ in addition to the at least one electrode $14$ used to apply the voltages $U_1$, $U_2$ and possibly $U_n$. The at least one quadrature electrode $24a$ and $24b$ is understood to mean an electrode type that is fastened to and/or in the capacitive sensor in such a way that an electrode surface $26a$ and $26b$ of the at least one quadrature electrode $24a$ and $24b$ aligned with the seismic mass $12$ is aligned parallel to the harmonic drive vibration of the seismic mass $12$ and a surface overlap between the respective electrode surface $26a$ or $26b$ and the seismic mass $12$ put into the harmonic drive vibration and projected onto the respective electrode surface $26a$ or $26b$ in a direction perpendicular to the harmonic drive vibration varies. The at least one quadrature electrode $24a$ and $24b$ is thus typically designed such that a potential difference between the respective quadrature electrode $24a$ and $24b$ and the seismic mass $12$ generates a force, dependent according to the harmonic drive vibration of the seismic mass $12$, between the respective quadrature electrode $24a$ and $24b$ and the seismic mass $12$ in the direction perpendicular to the harmonic drive vibration.

For example, while the seismic mass $12$ is put or being put into the resonant harmonic drive vibration, indicated by means of the arrows $20$, with the natural frequency $f_{20}$, a variable alternating voltage can be applied between the seismic mass $12$ and the at least one quadrature electrode $24a$ and $24b$. The variable alternating voltage is understood to mean a voltage signal with a test frequency $f_t$ varying within a frequency range $[f_{min}, f_{max}]$. The frequency range $[f_{min}, f_{max}]$ preferably corresponds to a range of the expected frequency difference $\Delta f_1$, $\Delta f_2$ or $\Delta f_n$. Due to the harmonic drive vibration of the seismic mass $12$, the force, generated by means of the applied variable alternating voltage, between the seismic mass $12$ and the at least one quadrature electrode $24a$ and $24b$ is modulated with the natural drive frequency $f_{20}$. The excitation of the seismic mass $12$ brought about by means of the variable alternating voltage is therefore resonant when a sum of the natural drive frequency $f_{20}$ and the test frequency $f_t$ is equal to the natural frequency $f_1$, $f_2$ or $f_n$ to be determined. This is true when the test frequency $f_t$ is equal to the frequency difference $\Delta f_1$, $\Delta f_2$ or $\Delta f_n$. Accordingly, an amplitude, perpendicular to the harmonic drive vibration, of the test vibration movement of the seismic mass $12$ induced by means of the variable alternating voltage is also maximal as soon as the test frequency $f_t$ is equal to the frequency difference $\Delta f_1$, $\Delta f_2$ or $\Delta f_n$. By means of a measurement of the transmission function of the rotation rate sensor, the frequency difference $\Delta f_1$, $\Delta f_2$ and possibly $\Delta f_n$ can therefore be determined reliably and accurately.

Alternatively, in order to determine the first natural frequency $f_1$ and at least also the second natural frequency $f_2$, a short constant voltage signal (unequal to zero) may in each case also be applied between the seismic mass 12 and at least one quadrature electrode 24$a$ and 24$b$ while the seismic mass 12 is put or being put into the resonant harmonic drive vibration with the natural frequency $f_{20}$. Such "abrupt switching-on" of the short voltage signal between the seismic mass 12 and the at least one quadrature electrode 24$a$ and 24$b$ excites the seismic mass 12 to an additional test vibration movement in a direction perpendicular to the harmonic drive vibration, wherein a proportion of modes with the natural frequency $f_1$, $f_2$ or $f_n$ to be determined in the test vibration movement of the seismic mass 12 decays relatively quickly. However, by demodulating a measurement signal tapped between the seismic mass 12 and the at least one quadrature electrode 24$a$ and 24$b$ at the natural frequency $f_{20}$ at the beginning of the test vibration movement, the frequency difference $\Delta f_1$, $\Delta f_2$ and possibly $\Delta f_n$ between the natural frequency $f_{20}$ and the natural frequency $f_1$, $f_2$ or $f_n$ to be determined can be ascertained. In order to determine the frequency difference $\Delta f_1$, $\Delta f_2$ and possibly $\Delta f_n$ on the basis of the measurement signal, a numerical fit can, for example, be performed or the zero crossings of the measurement signal can, for example, be examined. In this way, too, the natural frequency $f_1$, $f_2$ or $f_n$ to be determined can be reliably measured.

The method described herein also comprises at least one further method step S3, in which an actual gap distance d between the seismic mass 12 and the at least one electrode 14 and/or an actual variable $S_e$ for a sensitivity S of the capacitive sensor are determined, taking into account at least the first constant voltage $U_1$, the first natural frequency $f_1$ (determined in method step S2-1), the second constant voltage $U_2$ and the second natural frequency $f_2$ (determined in method step S2-2). One advantageous procedure for determining the actual gap distance d and/or the actual variable $S_e$ for the sensitivity S of the capacitive sensor is schematically illustrated using the coordinate system of FIG. 2C.

In the coordinate system of FIG. 2C, the abscissa indicates squares of voltages $U^2$, while natural frequencies f are illustrated by means of the ordinate. As illustrated in FIG. 2C, in an (optional) method step S3$a$, a frequency variation gradient $\Delta$ of the voltage-dependent natural frequencies of the seismic mass 12 can be determined according to equation (Eq. 10) on the basis of the values $U_1$, $U_2$, $f_1$ and $f_2$ as follows:

$$\Delta = \frac{f_2 - f_1}{U_2^2 - U_1^2} \qquad \text{(Eq. 10)}$$

Subsequently, in a further (optional) method step S3$b$, the actual gap distance d between the seismic mass 12 and the at least one electrode 14 and/or the actual variable $S_e$ for the sensitivity S of the capacitive sensor can be determined, taking into account the determined frequency variation gradient $\Delta$. In particular, a response sensitivity $S_e$ of the at least one electrode 14 of the capacitive sensor can be determined as the actual variable $S_e$ for the sensitivity S of the capacitive sensor. Advantageously, in order to determine the actual gap distance d and/or the response sensitivity $S_e$, equations (Eq. 11) and (Eq. 12) can be used, as follows:

$$\frac{1}{d^3} = \Delta * K_1 \qquad \text{(Eq. 11)}$$

$$S_e = \Delta^{\frac{2}{3}} * K_2 \qquad \text{(Eq. 12)}$$

The constants $K_1$ and $K_2$ can be determined by means of a single calibration or can be calculated using the equations given above.

As an advantageous development of the method described herein, an (optional) method step S4 can also be performed at least once. In method step S4, an actual gap distance d (determined in method step S3) as the reference gap distance $d_0$, an actual variable $S_e$ for the sensitivity S of the capacitive sensor (determined alternatively or additionally in method step S3) as the reference variable $S_{e0}$, and/or a frequency variation gradient $\Delta$ (determined in method step S3$a$) as the reference frequency variation gradient $\Delta_0$ can be stored in a storage device. At at least one later point in time, an (optional) method step S5 can then be performed. In method step S5, an actual gap distance d redetermined at the respective point in time is compared to the reference gap distance $d_0$, an actual variable $S_e$ for the sensitivity S of the capacitive sensor redetermined at the respective point in time is compared to the reference variable $S_{e0}$, and/or a frequency variation gradient $\Delta$ redetermined at the respective point in time is compared to the reference frequency variation gradient $\Delta_0$.

As an advantageous development, in a further (optional) method step S6, an actual amplification factor of a signal path of the capacitive sensor can also be adjusted or controlled according to a target variable, stored in the storage device, for a (desired) target amplification factor of the signal path. For this purpose, taking into account the actual gap distance d compared to the reference gap distance $d_0$, the actual variable $S_e$ compared to the reference variable $S_{e0}$, and/or the frequency variation gradient $\Delta$ compared to the reference frequency variation gradient $\Delta_0$, and additionally taking into account the target variable, at least one amplification device in the signal path is adjusted or controlled until an actual amplification factor of the signal path corresponds to the target variable. This brings about an "adjustment" of the signal path in such a way that an actual amplification factor of a provided signal corresponds to the desired target amplification factor. Method step S6 is preferably performed whenever it is recognized in method step S5 that the at least one value d, $S_e$, or $\Delta$ redetermined at the respective point in time deviates at least discernibly from the assigned reference value $d_0$, $S_{e0}$, or $\Delta_0$. In this way, it can be ensured that, despite an interim change in the actual gap distance d at the capacitive sensor, the desired response sensitivity $S_e$ of the capacitive sensor is nevertheless (substantially) achieved again.

Optionally, after method step S4, in a further (optional) method step S7, taking into account a stored initial value $S_0$, a new sensitivity S of the capacitive sensor can also be determined according to equation (Eq. 13) as follows:

$$S = \left(\frac{\Delta}{\Delta_0}\right)^{\frac{2}{3}} * S_0 \qquad \text{(Eq. 13)}$$

What is claimed is:

1. An operator device for a capacitive sensor, comprising:
a voltage application device configured to selectively apply: (i) at least a first constant voltage unequal to zero between a seismic mass of the capacitive sensor and at least one electrode of the capacitive sensor, and (ii) a second constant voltage unequal to zero between the seismic mass of the capacitive sensor and the at least one electrode of the capacitive sensor; and an electronic device configured to determine an actual gap distance between the seismic mass and the at least one electrode and/or an actual variable for a sensitivity of the capacitive sensor, taking into account: (i) at least the first constant voltage, a first natural frequency, self-determined by the electronic device or provided to the electronic device, of a first harmonic vibration of the seismic mass along a spatial direction, centrally intersecting the seismic mass and the at least one electrode, when the first constant voltage is applied between the seismic mass and the at least one electrode, and (ii) the second constant voltage and a self-determined or provided second natural frequency of a second harmonic vibration of the seismic mass along the spatial direction, centrally intersecting the seismic mass and the at least one electrode, when the second constant voltage is applied between the seismic mass and the at least one electrode.

2. The operator device according to claim 1, wherein the electronic device is configured to determine the actual gap distance d between the seismic mass and the at least one electrode, taking into account the first constant voltage $U_1$, the first natural frequency $f_1$, the second constant voltage $U_2$ and the second natural frequency $f_2$, according to the equation:

$$\frac{1}{d^3} = \frac{f_2 - f_1}{U_2^2 - U_1^2} * K_1,$$

wherein a constant $K_1$ is stored in a storage device of the operator device.

3. The operator device according to claim 1, wherein the electronic device is configured to determine a response sensitivity $S_e$ of the at least one electrode of the capacitive sensor as the actual variable $S_e$ for the sensitivity of the capacitive sensor, taking into account the first constant voltage $U_1$, the first natural frequency $f_1$, the second constant voltage $U_2$ and the second natural frequency $f_2$, according to the following equation:

$$S_e = \left(\frac{f_2 - f_1}{U_2^2 - U_1^2}\right)^{\frac{2}{3}} * K_2,$$

wherein a constant $K_2$ is stored in the storage device of the operator device.

4. The operator device according to claim 3, wherein the electronic device is configured to at least once store the determined actual gap distance as a reference gap distance and/or the determined actual variable for the sensitivity of the capacitive sensor as a reference variable in the storage device of the operator device and that, at at least one later point in time, an actual gap distance redetermined at the later point in time can be compared to the reference gap distance and/or an actual variable for the sensitivity of the capacitive sensor redetermined at the later point in time can be compared to the reference variable.

5. The operator device according to claim 4, wherein the electronic device is configured in such a way that, taking into account the actual gap distance compared to the reference gap distance and/or the actual variable compared to the reference variable, and additionally taking into account a target variable, stored in the storage device of the operator device, for a target amplification factor of a signal path of the capacitive sensor, at least one amplification device in the signal path can be adjusted or controlled using the electronic device in such a way that an actual amplification factor of the signal path corresponds to the target variable.

6. A capacitive sensor, comprising:

an operator device, including:

a voltage application device configured to selectively apply: (i) at least a first constant voltage unequal to zero between a seismic mass of the capacitive sensor and at least one electrode of the capacitive sensor, and (ii) a second constant voltage unequal to zero between the seismic mass of the capacitive sensor and the at least one electrode of the capacitive sensor, and an electronic device configured to determine an actual gap distance between the seismic mass and the at least one electrode and/or an actual variable for a sensitivity of the capacitive sensor, taking into account: (i) at least the first constant voltage, a first natural frequency, self-determined by the electronic device or provided to the electronic device, of a first harmonic vibration of the seismic mass along a spatial direction, centrally intersecting the seismic mass and the at least one electrode, when the first constant voltage is applied between the seismic mass and the at least one electrode, and (ii) the second constant voltage and a self-determined or provided second natural frequency of a second harmonic vibration of the seismic mass along the spatial direction, centrally intersecting the seismic mass and the at least one electrode, when the second constant voltage is applied between the seismic mass and the at least one electrode.

7. The capacitive sensor according to claim 6, wherein the capacitive sensor is a rotation rate sensor.

8. A method for operating a capacitive sensor, comprising the following steps:

applying a first constant voltage unequal to zero between a seismic mass of the capacitive sensor and at least one electrode of the capacitive sensor, and applying a second constant voltage unequal to zero between the seismic mass and the at least one electrode;

determining a first natural frequency of a first harmonic vibration of the seismic mass along a spatial direction, centrally intersecting the seismic mass and the at least one electrode, when the first constant voltage is applied between the seismic mass and the at least one electrode, and determining a second natural frequency of a second harmonic vibration of the seismic mass along the spatial direction, centrally intersecting the seismic mass and the at least one electrode, when the second constant voltage is applied between the seismic mass and the at least one electrode; and determining an actual gap distance between the seismic mass and the at least one electrode and/or an actual variable for a sensitivity of the capacitive sensor, taking into account at least the first constant voltage, the determined first natural frequency, the second constant voltage, and the determined second natural frequency.

9. The method according to claim 8, wherein a frequency variation gradient of voltage-dependent natural frequencies of the seismic mass is determined taking into account at least the first constant voltage, the determined first natural frequency, the second constant voltage, and the determined second natural frequency, and wherein the actual gap distance between the seismic mass and the at least one electrode and/or the actual variable for the sensitivity of the capacitive sensor are determined taking into account the determined frequency variation gradient.

10. The method according to claim 8, wherein, to determine the first natural frequency and the second natural frequency, a variable alternating voltage with a varying test frequency is in each case applied between the seismic mass and at least one quadrature electrode of the capacitive sensor while the seismic mass is put into a resonant harmonic drive vibration with a natural drive frequency, and it is examined at which test frequency the seismic mass is put into a resonant vibration using the variable alternating voltage.

11. The method according to claim 8, wherein, to determine the first natural frequency and the second natural frequency, a short constant voltage signal is in each case applied between the seismic mass and at least one quadrature electrode of the capacitive sensor while the seismic mass is put into a resonant harmonic drive vibration with a natural drive frequency.

12. The method according to claim 8, wherein, at least once, the determined actual gap distance as a reference gap distance and/or the determined actual variable for the sensitivity of the capacitive sensor as a reference variable are stored in a storage device, and, at at least one later point in time, an actual gap distance redetermined at the later point in time is compared to the reference gap distance and/or an actual variable for the sensitivity of the capacitive sensor redetermined at the later point in time is compared to the reference variable, and, taking into account the actual gap distance compared to the reference gap distance and/or the actual variable compared to the reference variable, and taking into account a target variable, stored in the storage device, for a target amplification factor of a signal path of the capacitive sensor, at least one amplification device in the signal path is adjusted or controlled until an actual amplification factor of the signal path corresponds to the target variable.

* * * * *